United States Patent [19]

Pradere et al.

[11] 4,348,599

[45] Sep. 7, 1982

[54] PROCESS AND DEVICE FOR DELIVERING A MONOCHROMATIC LIGHT BEAM BY STIMULATED SCATTERING

[75] Inventors: François Pradere, Soisy sur Montmorency; Robert Frey, Paris, both of France

[73] Assignee: Centre Nationale de la Recherche Scientifique, Paris, France

[21] Appl. No.: 264,095

[22] Filed: May 15, 1981

[30] Foreign Application Priority Data

May 16, 1981 [FR] France ................................ 80 11064

[51] Int. Cl.³ ............................................. H03F 7/00
[52] U.S. Cl. ...................................... 307/426; 330/4.6
[58] Field of Search ......................... 307/426; 330/4.6

[56] References Cited

U.S. PATENT DOCUMENTS 3,515,897  6/1970  Culver .................................. 307/426

Primary Examiner—David C. Nelms
Assistant Examiner—Darwin R. Hostetter
Attorney, Agent, or Firm—Finnegan, Henderson, Farabow, Garrett & Dunner

[57] ABSTRACT

For generation of a light beam having a narrow linewidth, an energy extraction beam of narrow linewidth, typically from a pulsed laser, is directed into a Raman medium having a large stimulated line. A second source, typically a pulsed laser, delivers a beam coaxial to the first in the medium. The frequency of the first beam is within the stimulated emission line of the medium induced by the second frequency and energy transfer occurs from the second to the first beam without substantial increase in the spectral linewidth.

8 Claims, 1 Drawing Figure

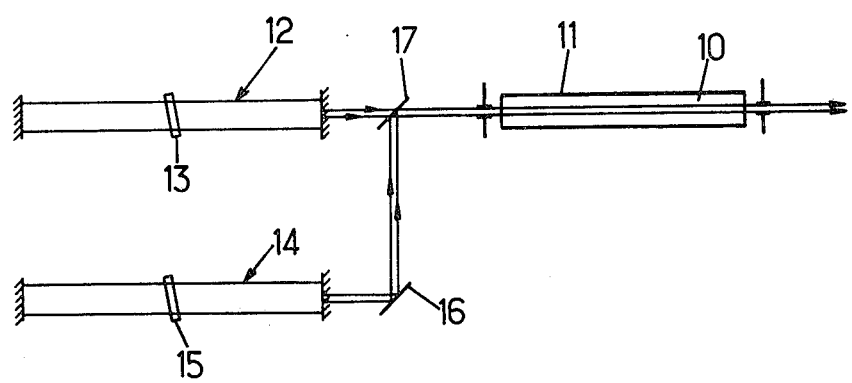

PROCESS AND DEVICE FOR DELIVERING A MONOCHROMATIC LIGHT BEAM BY STIMULATED SCATTERING

BACKGROUND AND SUMMARY OF THE INVENTION

The invention relates to a process and a device for delivering a monochromatic output light beam having a narrow spectrum linewidth; it is particularly—but not exclusively—suitable for use in photochemistry.

It is well known that intense light beams having a spectrum linewidth as narrow as possible is of great interest in numerous photochemistry fields, for instance for isotopic separation or purification operations.

There exist techniques for reducing the spectrum line-width of a beam which use passive filtering apparatus (prism monochromators, diffraction grating monochromators, interferential filters, Fabry-Perot etalons and the like). Any reduction in the spectrum linewidth is obtained at the cost of reduction of the light intensity of the beam in higher proportion. Consequently, any passive filtering operation results in a reduction in the monochromatic intensity defined as the ratio of the light intensity to the spectrum linewidth.

It is an object of the invention to provide a process and a device delivering an intense light beam of very small spectrum linewidth, the term "light" being construed as designating the whole zone of the spectrum covering the infrared, the visible and the ultraviolet (i.e. approximately from 100 nm to 100 μm).

According to an aspect of the invention, there is provided a process for generation of a light beam with a narrow spectrum linewidth, comprising, superimposing an amplifying medium exhibiting a large stimulated light emission spectrum linewidth at a first frequency and a pump light beam at a second frequency, higher than said first frequency, the first frequency being contained in the stimulated emission spectrum linewidth of the medium induced by the second frequency.

Two results are attained by the process:

the intensity of the light radiation beam at the first frequency may be considerably increased without substantial degradation of the spectrum linewidth, whereby there is an increase of the monochromatic intensity;

an appreciable fraction of the energy of the beam at the second frequency, whose spectral width may be large, is transferred to the beam at the first frequency, of narrow spectral width; in other words, spectral compression is achieved with a relatively high transfer efficiency.

That process is quite different from those which use stimulated light scattering for frequency shift. The latter processes use amplification of the inherent noise (typically Raman noise) of the system so that the spectral characteristics of the radiation obtained depend on the spectrum linewidth $\Delta\sigma_T$ of the transition in the medium and on the spectrum linewidth of the pump wave $\Delta\sigma_p$. On the other hand, according to the invention, a very monochromatic signal is injected, whose width $\Delta\sigma_S$ may be very much less than $\Delta\sigma_p$ and whose frequency is within the spectrum region where the pump wave induces a gain.

In a particular embodiment an amplifying medium presenting Raman scattering is used. The second beam forms in this case the pump beam. The first one having a much smaller spectrum linewidth than that of the transition is at a frequency equal to or close to that of the Stokes spectrum line which would be induced by the pump beam if the gain were sufficient. The two beams may be provided by pulsed lasers.

Instead of using Raman effect stimulated light scattering, other properties may be used and particularly Rayleigh scattering (with frequency change) or Brillouin scattering. Implementation of the invention by Raman effect entails refraining to reach the threshold of the Brillouin effect, since there would otherwise appear competition between the two effects.

Although lasers are radiation sources particularly suitable for implementing the invention, other sources of coherent monochromatic radiation in the useful spectrum may be used, e.g. parametric oscillator systems.

The invention also relates to a device for implementing the above-defined process. According to another aspect, there is provided a device for generation of a monochromatic light output beam having a narrow spectrum line, comprising: an enclosure for receiving a medium having a wide induced amplification spectrum line; a first pulsed light source for energy extraction selected to inject a light beam with a narrow spectrum linewidth at a first frequency into said medium; a second pulsed source for pumping action which provides in operation a light beam at a second frequency, different from the first, said first frequency being selected to be within the amplification spectrum line of the medium when subjected to the action of the pump beam; and optical means for rendering the two beams colinear in the enclosure.

The invention will be better understood from the following description of a particular embodiment. The description refers to the accompanying FIGURE which is a simplified diagram of that embodiment.

DETAILED DESCRIPTION OF A PARTICULAR EMBODIMENT

Referring to the FIGURE, there is shown a device which uses an amplifying medium 10 capable of exhibiting stimulated Raman scattering, for example a hydrogen and argon mixture under an adjustable pressure. The mixture is contained in an enclosure 11 whose length is sufficient to avoid oscillations due to multiple reflections during the time duration of one light pulse. A length of about one meter is satisfactory for pulses of 2.5 ns. In a mixture of ⅔ hydrogen and ⅓ argon under a variable pressure of 1 to 100 bars, the spectrum linewidth $\Delta\sigma_T$ of the mixture for the Q1 transition of hydrogen may be varied.

The energy delivering beam or pump beam, at the second mentioned frequency, is supplied by a pulsed laser 12. Laser 12 may be a multi-stage dye laser, having an oscillator stage and at least one amplifier stage. The spectrum linewidth of the pump beam $\Delta\sigma_p$ must be less than $\Delta\sigma_T$. The frequency of the pump beam may vary within wide limits. By way of example, a dye laser has been used with $\Delta\sigma_p$ between 0.043 and 0.42 cm$^{-1}$ and $\sigma_p = 13,900$ cm$^{-1}$, whereas $\Delta\sigma_T$ was of from 0.40 to 0.45 cm$^{-1}$. Laser 12 will in general comprise an element for adjusting the spectrum linewidth, such as a Fabry-Perot etalon 13.

The energy extraction beam, at the first above-mentioned frequency, may be provided by a dye laser 14 similar to laser 12 and triggered in synchronism therewith. Lasers 12 and 14 may be energized by the same pumping source, for example a ruby laser. Laser 14 will comprise at least one dispersive element 15 for adjusting the wave-length (i.e. tuning and adjusting the spectrum linewidth. It will be tuned to emit at a wave-length corresponding to the Stokes spectrum line which would be generated by the pumping beam if the gain were sufficient. If, as indicated above, the laser 12 is selected for $\sigma P = 13,900$ cm$^{-1}$, a laser 14 may be selected for $\sigma S = 9750$ cm$^{-1}$ and $\Delta \sigma_S$ of from 0.013 to 0.017.

Optical means are arranged for rendering the output beams of lasers 12 and 14 colinear in tank 11. In the FIGURE, the optical means are schematized as a first mirror 16 for reflecting the energy extraction beam and a mirror 17 transparent for the pump wave length and reflecting the energy extraction wave length (dielectric layer mirror in general). Laser 14 and especially laser 12 which has a wider spectrum linewidth, may have high peak powers: tests have been carried out with a power of 200 MW/cm$^2$ for the pump beam and a few MW/cm$^2$ for the energy extraction beam. Table I gives, by way of example, results which were obtained from representative tests of the different modes of use which may be contemplated:

TABLE I

| Test No. | $\Delta\sigma_T$ (cm-1) | $\Delta\sigma_M$ (cm-1) | $\Delta\sigma_P$ (cm-1) | Input $\Delta\sigma_S$ (cm-1) | Output $\Delta\sigma_S$ (cm-1) | A | R % | T |
|---|---|---|---|---|---|---|---|---|
| 1 | 0.40 | 0 | .043 | .017 | .016 | 9 | 80 | 1.4 |
| 2 | 0.40 | 0.32 | .043 | .017 | .018 | 8 | 54 | 1 |
| 3 | 0.40 | 0 | .043 | .017 | .017 | 500/3000 | 2–15 | 0.03–0.26 |
| 4 | 0.55 | 0 | .41 | .013 | .013 | 7 | 72 | 16 |

In the above table, $\Delta\sigma_T$, $\Delta\sigma_P$ and $\Delta\sigma_S$ have the above-mentioned meanings; A designates the amount of amplification obtained, i.e. the ratio between the value which the wave at the frequency of the Stokes spectrum line exhibits at the output of enclosure 11 and the value of the energy extraction beam. R designates the quantum conversion efficiency. T designates the spectral compression rate defined as:

$$T = (\Delta\sigma_P/\Delta\sigma_S) \times (\sigma_S/\sigma_P) \times R$$

The value of the spectral compression rate reflects the degree of energy transfer from the pump beam, which has a relatively wide spectrum, to the spectrally narrow "signal" beam.

The tests summarized in the table have been selected to outline different possibilities offered by the invention.

In all cases, it can be seen that after amplification ($\Delta\sigma_s$) at the output of tank 11 there is practically no increase of the linewidth as compared to $\Delta\sigma_S$ at the input, even when the spectrum linewidth of the Raman transition $\Delta\sigma_T$ is large as compared to $\Delta\sigma_S$.

The amplification may be varied in a large range. It is limited only by the depopulation of the pump wave. It depends both on the intensity of the pump wave and on that of the energy extraction wave. The amount of amplification and the degree of efficiency vary in opposite directions.

Maximum amplification: for some applications, high degrees of amplification are desirable. In the case of test No. 3, values of the order of 3000 are reached by directing a low intensity energy extraction beam into the medium. On the other hand, the quantum efficiency is low.

High quantum efficiency: for other applications quantum efficiencies as high as possible may be desired. This result is attained for low amplifications. It may reach 80% (test No. 1) and even exceed it provided that the light beams are very homogeneous.

High spectral compression rate: for yet other applications, spectral compression as high as possible is required, i.e. an increase in the ratio between the spectrum linewidth and the intensity, even at the cost of reduced intensity. Test No. 4 shows that the result is attained by using a Raman medium having a quite large transition spectrum linewidth.

Tuning: Test No. 2 shows that the wavelength of the energy extraction need not necessarily correspond exactly to the Stokes spectrum line, for the Raman transition spectrum line is relatively wide. In the case of test No. 2, while the difference $\Delta\sigma_M = \sigma_P - \sigma_S$ was 0.32 cm$^{-1}$, quantum efficiency was only decreased in a relatively low ratio. This tuning possibility presents great interest when the pump beam is supplied by a laser which only can deliver discrete frequencies, such as a CO$_2$ laser. Then the Stokes frequency may be tuned within the Raman spectrum line by adjusting the tuning means of the energy extraction laser 14.

High amplification and acceptable quantum efficiency: the objects may be conciliated by using a multi-stage system in which the first stage at least provides a high value of A and the last stage at least is selected to exhibit a high value of R.

The repetition rate of the pulses which may be obtained is limited by that of the pump laser and by the heating up of the Raman medium. Apparatuses may be constructed which supply a radiation with high mean power and great spectral purity, with satisfactory efficiency.

Numerous modified embodiments are possible: phenomena other than the Raman effect may be used. The source of the energy extraction beam may be of any type capable of supplying coherent monochromatic light pulses, for example a diode laser. The pump beam may be delivered by any source with wide or narrow band (parametric oscillator, CO$_2$ laser, HF laser, etc.). Instead of the Raman effect, the use of stimulated light diffusion by Brillouin effect may be contemplated, as well as other non linear physical actions involving interaction of at least two types of photons.

We claim:

1. A process for generation of a light beam with a narrow spectrum linewidth, comprising: superimposing, in an amplifying medium exhibiting a large stimulated light emission spectrum linewidth, an energy extraction light beam having a narrow spectrum linewidth at a first frequency and a pump light beam at a second frequency, higher than said first frequency, the first frequency being contained in the stimulated emission spectrum linewidth of the medium induced by the second frequency.

2. A process according to claim 1, wherein the first frequency is the frequency of the Raman scattering Stokes spectrum line of the medium.

3. A process according to claim 1, wherein the first frequency is adjustable and contained in the Raman spectrum line of the medium which is stimulated by the second frequency.

4. A process according to claim 2 or 3, wherein the spectrum linewidth of the pump light beam is less than the spectrum linewidth of the Raman transition in the medium.

5. A process according to claim 1, 2 or 3, wherein said light beams are injected into said medium by lasers operating in pulsed mode and triggered in time coincidence.

6. A device for generation of a monochromatic light output beam having a narrow spectrum line, comprising: an enclosure for receiving a medium having a wide induced amplification spectrum line; a first pulsed light source for energy extraction selected to inject a light beam with a narrow spectrum linewidth at a first frequency into said medium; a second pulsed source for pumping action which provides in operation a light beam at a second frequency, different from the first, said first frequency being selected to be within the amplification spectrum line of the medium when subjected to the action of the pump beam; and optical means for rendering the two beams colinear in the enclosure.

7. A device according to claim 6, wherein the sources are two pulsed lasers associated with a same laser providing pumping energy to the pulsed lasers.

8. A device according to claim 7, having a plurality of stages, the first stage at least being arranged so as to exhibit a high amplification level and the last stage at least being arranged for a high value of the quantum efficiency of energy transfer from the pump beam to the output beam.

* * * * *